United States Patent [19]

Nussbaum

[11] 3,962,084
[45] June 8, 1976

[54] RAIN STORING TANK

[76] Inventor: Gert Nussbaum, Schulstrasse, 7111 Bitzfled, Germany

[22] Filed: July 12, 1974

[21] Appl. No.: 488,017

Related U.S. Application Data

[63] Continuation of Ser. No. 370,442, June 15, 1973, abandoned, which is a continuation of Ser. No. 122,974, March 10, 1971, abandoned.

[52] U.S. Cl. ............................ 210/83; 210/512 R; 210/532 R; 209/211
[51] Int. Cl.² ........................................ B01D 21/00
[58] Field of Search .................. 210/65, 74, 83, 84, 210/170, 172, 253, 259, 294, 322, 512, 519, 532; 404/4; 209/211

[56] References Cited
UNITED STATES PATENTS

| | | | |
|---|---|---|---|
| 660,214 | 10/1900 | Gathmann | 210/512 |
| 711,155 | 10/1902 | Gathmann | 210/512 |
| 1,053,396 | 2/1913 | Imhoff | 210/74 |
| 2,425,932 | 8/1947 | Green et al. | 210/512 |
| 2,677,657 | 5/1954 | Jenks | 210/512 |
| 3,078,999 | 2/1963 | Kelly | 210/512 |
| 3,419,145 | 12/1968 | De Celis | 210/84 |
| 3,626,823 | 12/1971 | Toth | 404/4 |

FOREIGN PATENTS OR APPLICATIONS

| | | | |
|---|---|---|---|
| 1,014,520 | 1952 | France | 210/512 |
| 1,037,419 | 8/1958 | Germany | 210/512 |
| 677,841 | 1939 | Germany | 210/512 |
| 1,945,922 | 4/1971 | Germany | 210/512 |
| 419,071 | 11/1934 | United Kingdom | 210/512 |

*Primary Examiner*—Charles N. Hart
*Assistant Examiner*—Ernest G. Therkorn
*Attorney, Agent, or Firm*—Arthur Schwartz

[57] ABSTRACT

A rain storing tank of generally circular design having a combined-water channel entering the tank substantially tangentially and having a sanitary sewage drain line leading from substantially the center of the bottom of the tank.

2 Claims, 18 Drawing Figures

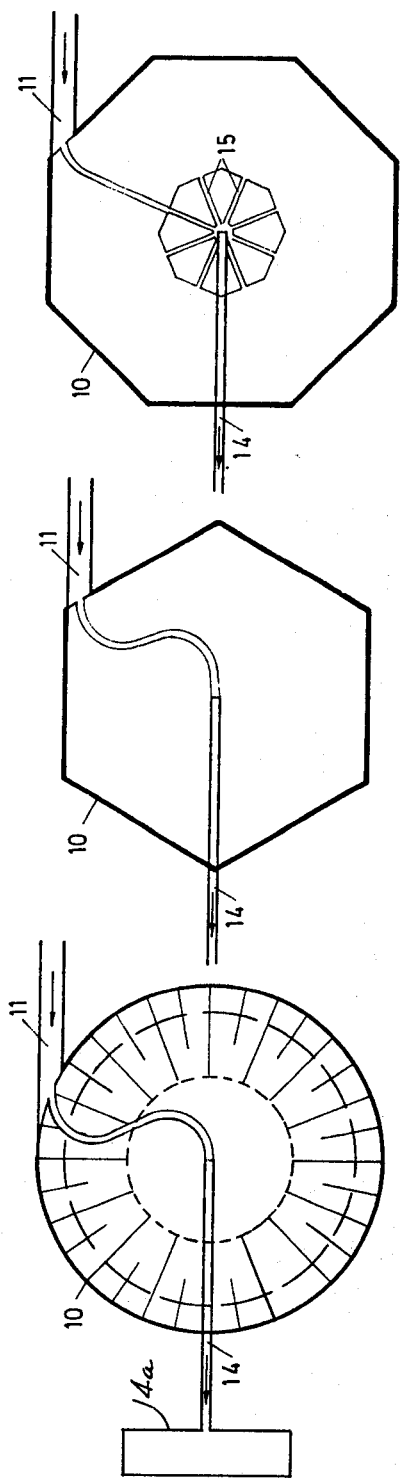
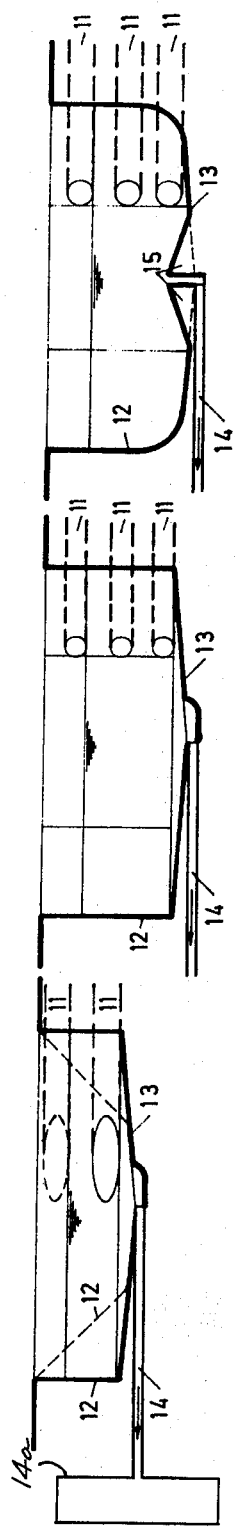
FIG. 1a FIG. 1b FIG. 1c
INVENTOR.
GERT NUSSBAUM
BY Arthur Schwartz

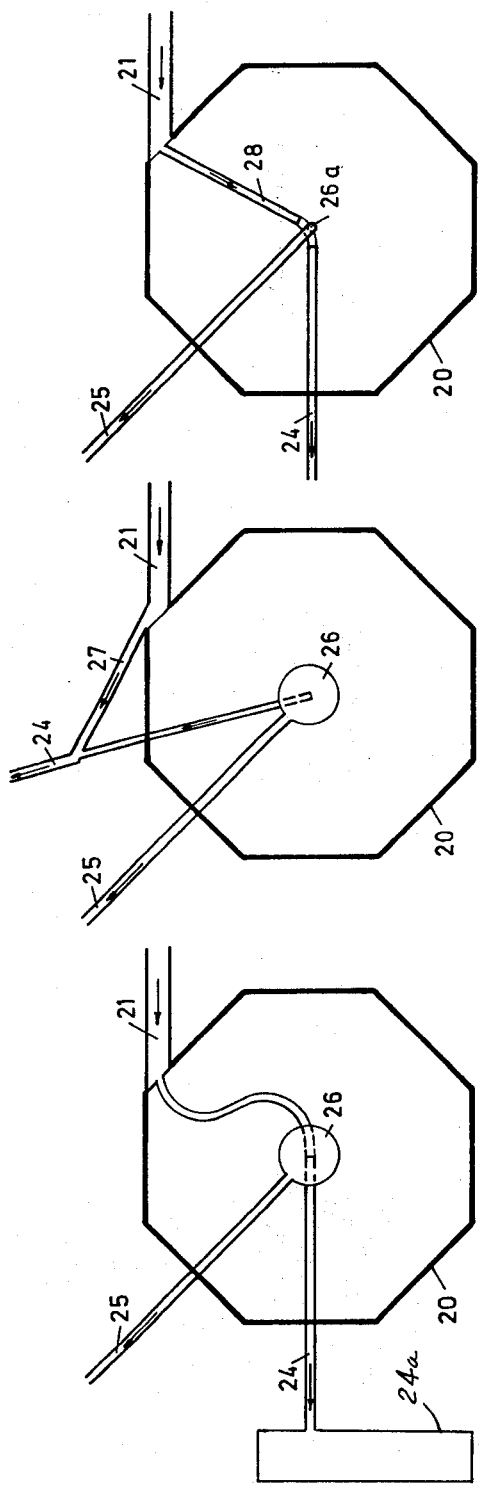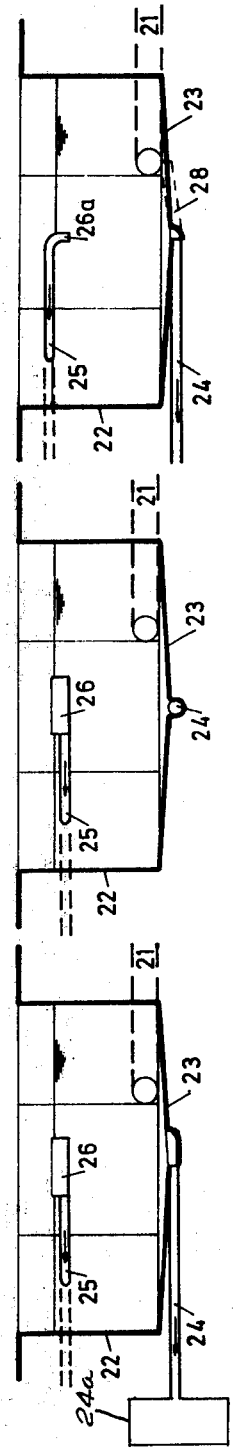

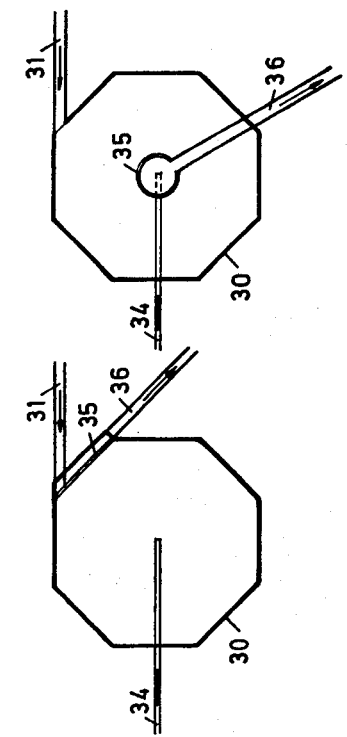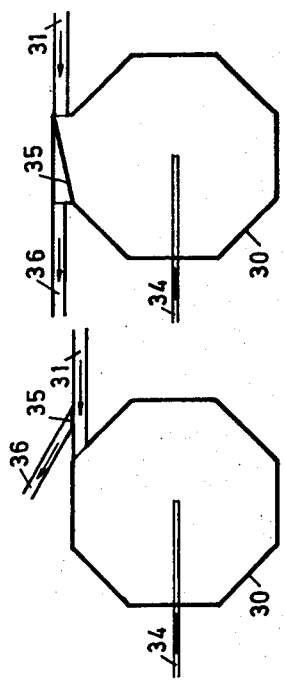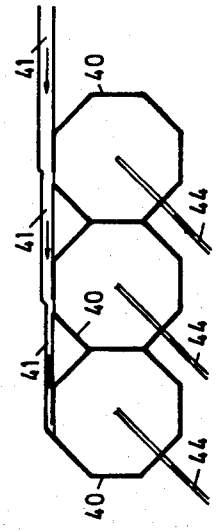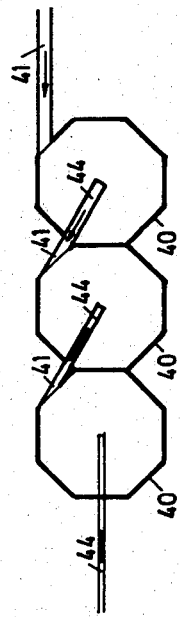

RAIN STORING TANK

This is a continuation of application Ser. No. 370,442, filed June 15, 1973, now abandoned, which in turn is a continuation of Ser. No. 122,974, filed Mar. 10, 1971, and now abandoned.

BACKGROUND OF THE INVENTION

In public sewer systems sanitary sewage and rain water are usually collected in a single system of pipes called a combining system. The dry-weather flow collected in such a system is mechanically and biologically purified in a sewage purification plant. According to usual regulations the collecting line which leads to the purification plant must be capable of holding at least five times the amount of dry-weather flow or a critical quantity of rain water. The combined water, which in the case of heavy rain exceeds the volumetric capacity of the main sewer, passes via a rain outlet or overflow gate, arranged so as to follow the draining area, directly into the receiving water (free body of water). The pollution of bodies of water resulting therefrom which has to be avoided for hygienic reasons and considerations related industrial water development is intensified by the fact that at each rainfall the first tide wave is strongly polluted and furthermore by the rinsing effect exerted in the sewer system such tide wave is strongly enriched with sanitary sewage particles.

A known device consists in replacing the rain outlet by a rain-storing tank which stores the first, strongly polluted, combined water and feeds it at a time lag to the purification plant and/or purifies it mechanically by the detention period before discharging it into the receiving water. This permits use of a small diameter of the combined water line leading to the purification plant, which diameter can thus be adapted to the efficiency of the biological section of the purification plant. Notwithstanding such advantages, rain-storing tanks are rarely used. In known construction types only a small portion of the polluted sediment is conveyed, after the end of the rainstorm, into the purification plant because the discharged water produces no sufficient sweeping force for carrying off the sediments. Therefore a frequent cleansing by shoveling or spraying becomes necessary.

SUMMARY OF THE INVENTION

The invention aims to overcome the intolerable and increasing pollution of rivers and lakes and to simplify the known rain-storing tanks, eliminating the need for attendance.

An object of the invention is the provision of a rainstoring tank of substantially circular design, inserted in a main sewer which leads to the purification plant of a combined-water sewer system and constructed as a short-time storage device adapted to the biological receiving water capacity, possibly with emergency outlet. The tank is provided with tangentially entering combined-water channel and a sanitary sewage drain leading from the center of the tank bottom to the purification plant.

In the rain-storing tank of the invention the sanitary sewage flows in dry weather from the periphery directly to the central drain and therefrom to the purification plant. However, when it starts raining, the combined water shoots, because of its kinetic energy, tangentially into the tank and removes, by rinsing, the polluted sediments from the tank bottom. The tank capacity stores the first, strongly polluted rain water surge and prevents the discharge thereof to the receiving water. In the tank a circular flow originates which, on the one hand, rotates about the tank center and on the other hand, seen in sectional view, runs from the tank edge downward over the bottom of the tank center. Heavier sanitary sewage materials are conveyed, by cyclonic effect, first outward and then, by the superposed toroidal flow, via the tank bottom to the sanitary sewage outlet. While the tank is being increasingly filled up to the relief gate, the flow quiets down and a mechanical purification takes place, so that during persisting rainfall mechanically purified combined water can drain into the receiving water. While the tank is being emptied the flow continues to feed the purification plant uniformly, and the originating eddy or spiral flow assures a sweeping water force sufficient for a thorough cleansing of the tank bottom. Sediments not swept along are rinsed off to the outlet at the next rain surge.

BRIEF DESCRIPTION OF THE DRAWINGS

The invention is described with further characteristics and advantages with the aid of embodiments diagrammatically shown in the drawings, wherein:

FIGS. 1a, 1b, and 1c are plan views and cross sections of the rain-storing tanks of the invention, constructed as short-time storage tanks;

FIGS. 2a - 2c are rain-purifying tanks of the invention, constructed as storing and settling tanks;

FIGS. 3a - 3d are plan views of rain-purifying tanks of the invention with emergency outlet;

FIGS. 4a and 4b are tank combinations in series or parallel connection;

DETAILED DESCRIPTION OF INVENTION

Figure 5A:
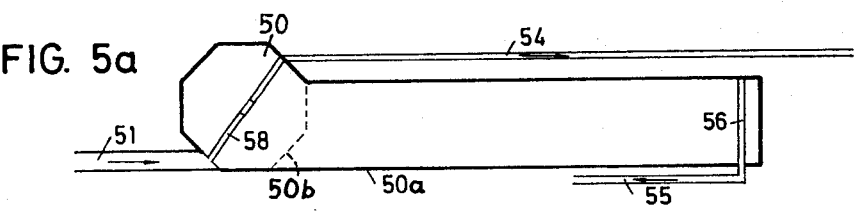
FIGS. 5a - 5d are plan views of combinations with extension tanks.

In FIGS. 1a – 1c a combined-water channel 11 is connected with a tank 10, which channel 11 enters tank sidewall 12 tangentially. The tank bottom 13 may be slanting from the periphery toward the central sanitary sewage outlet 14 which conveys the combined-water to purification plant 14a. However, the automatic tank cleansing, due to the flow processes at the draining of the tank and at the next rain water surge, is assured even without an inclination of the tank bottom.

In FIG. 1c, the cross section of the tank bottom is groove-shaped so as to support the toroidal flow superseding the circular flow, which toroidal flow passes from sidewall 12 downward over the tank bottom to the center. The bottom elevation in the tank center contains several radial channels 15 leading to the sanitary sewage outlet. Independently of the shape of the tank bottom, the sidewalls of the tank may be slanting upward and outward, especially in the case of an open construction (not shown), whereby an improved rinsing and cleansing effect is achieved.

In addition to the exclusive storing function of FIGS. 1a - 1c, the rain-purifying tank of FIGS. 2a – 2c may discharge mechanically prepurified combined water to the receiving water. In FIG. 2a a combined-water channel 21 is tangentially connected with an octagonal tank 20. The dry-weather flow passes via sanitary sewage outlet 24 into the purification plant 24a. When in case of a rainstorm the combined water in the tank reaches a certain level and stays for a certain length of time, an overflow 26, arranged in the tank center and leading via a line 25 to the receiving water, responds. In the tank center the velocity of the circular flow is approximately zero, and therefore the mechanical purification has advanced farthest in this quiet water.

While overflow 26 for the draining of mechanically prepurified combined water is retained in FIG. 2b, the sanitary sewage is removed from tank 20 by hydraulic means. A short-cut line 27 leads from the bottom of combined-water channel 21 to sanitary-sewage outlet 24.

In FIG. 2c a line 28 passes from the bottom of combined-water channel 21 via tank bottom 23 to the tank center and ends there at a short distance from sanitary sewage outlet 24 which leads to the purification plant. Mechanically prepurified water is withdrawn through a tubular bend 26a through which no floating polluted material enters the receiving water. In case of accidents, e.g., when an oil tank discharges into the draining area, the rain-purifying tank serves as a separator wherefrom the oil can be drained only into the purification plant.

In an embodiment not shown, the rain-purifying tank may contain, in the center of the tank bottom, a circular grit catcher wherefrom the sanitary sewage is removed by a free drain or through a pipe mounted upright in the tank center and a submersible pump fixed in the pipe. In the upright pipe a grit-withdrawing line may be arranged whose bottom opening is positioned at a lower level than the suction pipe of the submersible pump. Although the combined-water channel is shown as entering the tank only at one place, the automatic tank-cleansing and the mechanical purification effect are promoted if combined-water channels enter tangentially at several places of the tank periphery.

The rain-storing tank can be reduced to an economical size if for the determination of the volumetric capacity only the regional average rainfall is taken into account, whereas the rare excessive rainfalls occurring only on a few days of the year are excluded from the computation. For such cases main relief gates are provided in FIGS. 3a - 3d, which devices may also be added to the preceding embodiments. FIG. 3a shows a main relief gate or emergency outlet 35 in the combined-water line 31 preceding the point where the latter opens into tank 30. From gate 35 a line 36 leads to the receiving water. In FIG. 3b, the main relief gate 35 is arranged directly downstream behind the orifice of combined-water channel 31. When the gate responds, the tank which is filled with polluted combined water from the first rain surge is no longer loaded. In FIG. 3c the combined water has already carried out a complete circulation in the tank before it flows via line 36 to the receiving waters. In FIG. 3d, the main relief gate 35 is in the tank center, in which case the withdrawal of prepurified combined water according to FIG. 2 is eliminated.

In the series connection of FIG. 4a, the combined-water channel 4 opens tangentially into the first tank 40, while the drain departing from the center of the preceding tank feeds in each case the subsequent tank. This results in different sanitary sewage fractions or combined water of varying properties. In FIG. 4b, tanks 40 are connected in parallel and fed by fractions from a tapered combined-water channel 41, a sanitary sewage outlet 44 branching off from each tank.

Figure 5B:
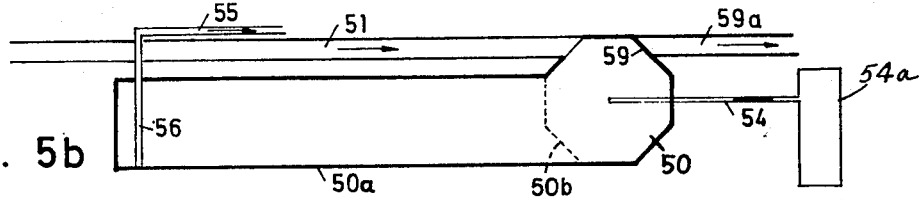

When space is lacking or the storage volume is larger, a round or polygonal tank 50, as shown in FIG. 5a, is combined with an extension tank 50a. The combined-water channel 51 opens tangentially into a tank 50 wherein baffles 50b produce the intended circular flow. The extension tank 50a which slants toward the round tank fills with quiet water. At 56, behind an immersion wall not shown, an overflow for mechanically purified water, flowing via line 55 to the receiving water, is provided. The sanitary sewage drain 54, which conveys the combined-water to purification plant 54a, departs from the center tank 50, in which structure a line 58 departing from combined-water channel 51 passes along the tank bottom to a point situated at a short distance from the sanitary sewage outlet. FIG. 5b shows a more favorable orifice of mixed-water channel 51, a main relief gate 59, and a line 59a leading to the receiving water.

Figure 5C:
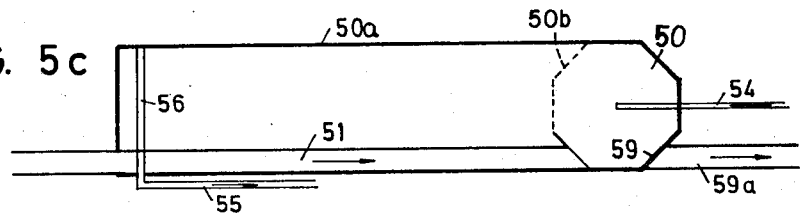
Figure 5D:
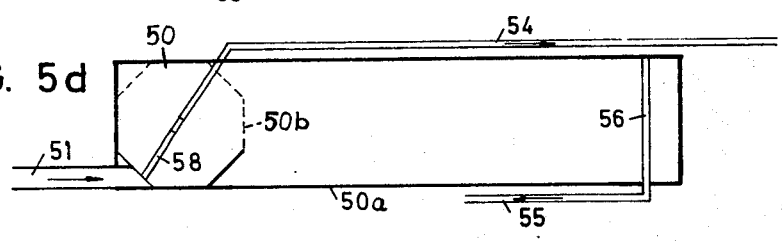

In FIG. 5c the combined-water channel 51 is for reasons of proper spacing constructed in such a way as to pass through extension tank 50a. Main relief gate 59 is arranged in an extension of combined-water channel 51 in the sidewall of polygonal tank 50. To simplify the construction, a baffle arrangement 50b, as shown in FIG. 5d, is inserted in a rectangular tank 50a, which baffle arrangement 50b forces the combined water into the intended circular flow and only thereafter permits the transmission of this water to the extension tank. The bottom of the polygonal tank can, as in FIG. 5a, be slanted toward the central sanitary sewage outlet 54.

Figure 6:
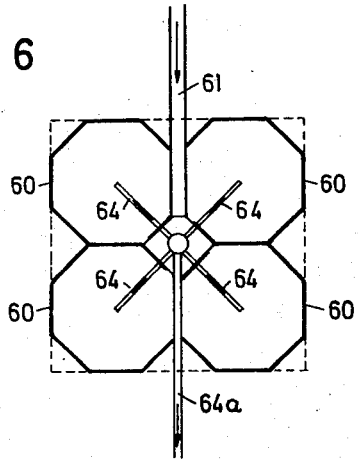
FIGS. 6 and 7 are examples for a construction method with several flow lines.
Figure 7:
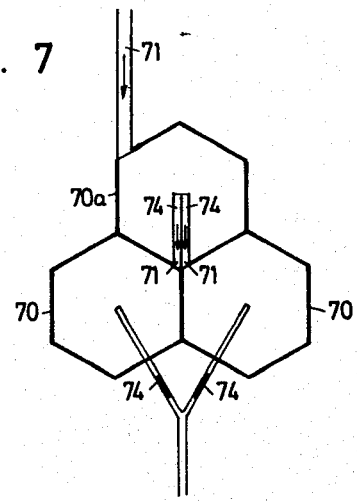

Space economies make possible a construction method with several flows as in FIGS. 6 and 7. By means of the polygonal shape adjacent sidewall parts are saved. It becomes possible to replace the octagonal tank, placed, as in FIG. 6, inside a rectangle, by a rectangular tank with baffles arranged therein. A combined-water channel 61 feeds all four tanks 60. Sanitary sewage outlets 64 are connected with a collector 64a. A still more condensed construction method is made possible by a hexagonal design as in FIG. 7, wherein, e.g., a first tank 70a is fed from a combined-water channel 71 and therefrom two outlets 74 lead into subsequent tanks 70.

The polygonal shape is advantageous also because of the simplified application in reinforced concrete structures. Prefabricated construction elements, ready on call at a central manufacturing plant and limiting the time required for tank manufacture to a minimum, are suitable for polygonal walls, bottom and ceiling elements.

While there has been described and illustrated specific embodiments of the invention, it will be clear that variations in the details of the embodiments specifically illustrated and described may be made without departing from the true spirit and scope of the invention as defined in the appended claims.

What is claimed is:

1. The method of reducing pollution of open waters by controlling the flow of mixed rain water and sewage to a purification plant, comprising the steps of:

establishing a flow path having a flow capacity for directing mixed rain water and sewage to a purification plant having a handling capacity and limiting the flow capacity of said path to a value not exceeding the handling capacity of said plant;

establishing a generally circular holding station having a storing capacity at that end of said flow path opposite to said purification plant;

directing mixed water and sewage from a predetermined drainage area to said holding station and from said holding station to said limited flow path;

directing said polluted mixture of rain water and sewage at the beginning of each rain fall tangentially into said station to induce circular flow thereof and prevent accumulation of solids at the bottom of said station;

temporarily holding the polluted mixture of rain water and sewage at said holding station which exceeds the flow capacity of said limited flow path, up to the storing capacity of said holding station while continuously releasing said polluted mixture of rain water and sewage from the central bottom portion of said holding station to said limited flow path;

discharging any further supply of dilute mixed rain water and sewage exceeding the storing capacity of said holding station and the flow capacity of said limited flow path from said holding station to ambient surroundings whereby only said polluted mixture is directed to said purification plant.

2. The method of clam 1 wherein the step of: discharging said further supply of relatively dilute mixture is performed at the upper portion of said holding station, when accumulated mixture exceeds the capacity of said holding station; and conducting said further dilute mixture to ambient surroundings.

* * * * *